(12) United States Patent
Soffer

(10) Patent No.: US 12,143,526 B2
(45) Date of Patent: Nov. 12, 2024

(54) SECURED SMARTPHONE COMMUNICATION SYSTEM

(71) Applicant: HIGH SEC LABS LTD., Caesarea (IL)

(72) Inventor: Aviv Soffer, Caesarea (IL)

(73) Assignee: HIGH SEC LABS LTD., Caesarea (IL)

( * ) Notice: Subject to any disclaimer, the term of this patent is extended or adjusted under 35 U.S.C. 154(b) by 212 days.

(21) Appl. No.: 17/800,552

(22) PCT Filed: Apr. 8, 2021

(86) PCT No.: PCT/IL2021/050408
§ 371 (c)(1),
(2) Date: Aug. 18, 2022

(87) PCT Pub. No.: WO2021/224905
PCT Pub. Date: Nov. 11, 2021

(65) Prior Publication Data
US 2023/0131220 A1  Apr. 27, 2023

(30) Foreign Application Priority Data

May 5, 2020 (IL) .......................................... 274452

(51) Int. Cl.
*H04M 1/72409* (2021.01)
*G06F 21/60* (2013.01)
(Continued)

(52) U.S. Cl.
CPC ....... *H04M 1/72409* (2021.01); *H04W 12/03* (2021.01); *H04W 12/43* (2021.01); *H04M 1/724098* (2022.02); *H04M 1/72412* (2021.01)

(58) Field of Classification Search
CPC ....... H04M 1/72409; H04M 1/724098; H04M 1/72412; H04M 1/0262; H04M 1/0254;
(Continued)

(56) References Cited

U.S. PATENT DOCUMENTS 7,197,291 B2   3/2007   Mach et al.
7,603,139 B1   10/2009  Tom
(Continued)

FOREIGN PATENT DOCUMENTS

DE   10140544 A1   3/2003
EP   2448216 A1    5/2012
(Continued)

OTHER PUBLICATIONS

Swica, "History of the Power Bank," https://medium.com/@swicaid/history-of-the-power-bank-262684b706a6, Sep. 18, 2018, medium.com.
(Continued)

*Primary Examiner* — Darren B Schwartz
(74) *Attorney, Agent, or Firm* — AlphaPatent Associates Ltd.; Daniel J. Swirsky

(57) ABSTRACT

A method for securing an off-the-shelf smartphone, a secure communication system, and a security insert is provided. The method comprises removing the battery from the off-the-shelf smartphone and inserting the security insert to the battery compartment. The security insert comprises cryptographic module. The method further comprises modifying off-the-shelf smartphone and providing a power and data connection between the security insert and the smartphone. The secure communication system wirelessly transmits outgoing cellular encrypted black data, which is encrypted by the cryptographic module, from the modified off-the-shelf smartphone to a cellular network, and decrypts, by the cryptographic module, incoming cellular black data receives from the cellular network to the modified off-the-shelf smartphone. The security insert enclosure configured to be deployed in a battery compartment.

39 Claims, 9 Drawing Sheets

(51) Int. Cl.
| | |
|---|---|
| *H04B 1/3888* | (2015.01) |
| *H04L 9/08* | (2006.01) |
| *H04M 1/02* | (2006.01) |
| *H04M 1/19* | (2006.01) |
| *H04M 1/675* | (2006.01) |
| *H04M 1/72412* | (2021.01) |
| *H04W 4/80* | (2018.01) |
| *H04W 12/03* | (2021.01) |
| *H04W 12/43* | (2021.01) |

(58) Field of Classification Search
CPC ....... H04M 1/675; H04M 1/19; H04W 12/03; H04W 12/43; H04W 4/80; H04L 2209/12; H04L 2209/80; H04L 9/0897; G06F 21/606; H04B 1/3888
See application file for complete search history.

(56) References Cited

U.S. PATENT DOCUMENTS

| | | | |
|---|---|---|---|
| 7,673,338 B1 | 3/2010 | Osburn et al. | |
| 8,190,221 B2 | 5/2012 | Jain et al. | |
| 8,367,235 B2 | 2/2013 | Huang | |
| 8,854,985 B2 | 10/2014 | Tsfaty et al. | |
| 9,098,696 B2 | 8/2015 | Johnson et al. | |
| 9,509,543 B2 | 11/2016 | Gaal et al. | |
| 9,887,571 B1 | 2/2018 | Sultenfuss et al. | |
| 2002/0187808 A1 | 12/2002 | Vallstrom et al. | |
| 2003/0068034 A1 | 4/2003 | Silvester | |
| 2003/0190927 A1 | 10/2003 | Leong et al. | |
| 2006/0046779 A1* | 3/2006 | Tracy | H04M 1/0254 455/575.1 |
| 2007/0123304 A1* | 5/2007 | Pattenden | H01M 10/4257 455/557 |
| 2008/0200208 A1* | 8/2008 | Llanos | H04M 1/72409 455/557 |
| 2009/0256717 A1* | 10/2009 | Iwai | G06F 1/26 700/295 |
| 2010/0210300 A1 | 8/2010 | Rizzo et al. | |
| 2010/0216522 A1* | 8/2010 | Bennis | H04W 52/0296 455/572 |
| 2011/0287726 A1* | 11/2011 | Huang | H04B 1/3888 455/90.3 |
| 2013/0034230 A1 | 2/2013 | Takahashi | |
| 2013/0324189 A1 | 12/2013 | Katis et al. | |
| 2014/0065948 A1 | 3/2014 | Huang | |
| 2014/0087722 A1 | 3/2014 | Brittain et al. | |
| 2014/0087788 A1 | 3/2014 | Filipovic et al. | |
| 2014/0221057 A1 | 4/2014 | Katis et al. | |
| 2014/0162729 A1* | 6/2014 | Garden | H04W 12/02 455/566 |
| 2014/0351474 A1* | 11/2014 | Chapman | G06F 13/4068 710/301 |
| 2015/0288684 A1* | 10/2015 | Schneider | H04L 63/0853 726/9 |
| 2019/0305563 A1 | 10/2019 | Koki et al. | |
| 2020/0127816 A1 | 4/2020 | Carper et al. | |

FOREIGN PATENT DOCUMENTS

| | | |
|---|---|---|
| EP | 2219353 B1 | 7/2012 |
| IL | 207180 B | 3/2016 |
| IL | 235508 B | 11/2018 |
| WO | WO2014060714 A2 | 4/2014 |
| WO | WO2019097511 A1 | 5/2019 |

OTHER PUBLICATIONS

Epsilor to Showcase Soldier Wearable Battery, https://www.epsilor.com/pr08082018/.

Dan Lafontaine, Conformal battery unburdens Army's networked Soldiers, U.S. Army Research, Development and Engineering Command, Jul. 17, 2013 https://www.army.mil/article/107362/conformal_battery_unburdens_armys_networked_soldiers.

* cited by examiner

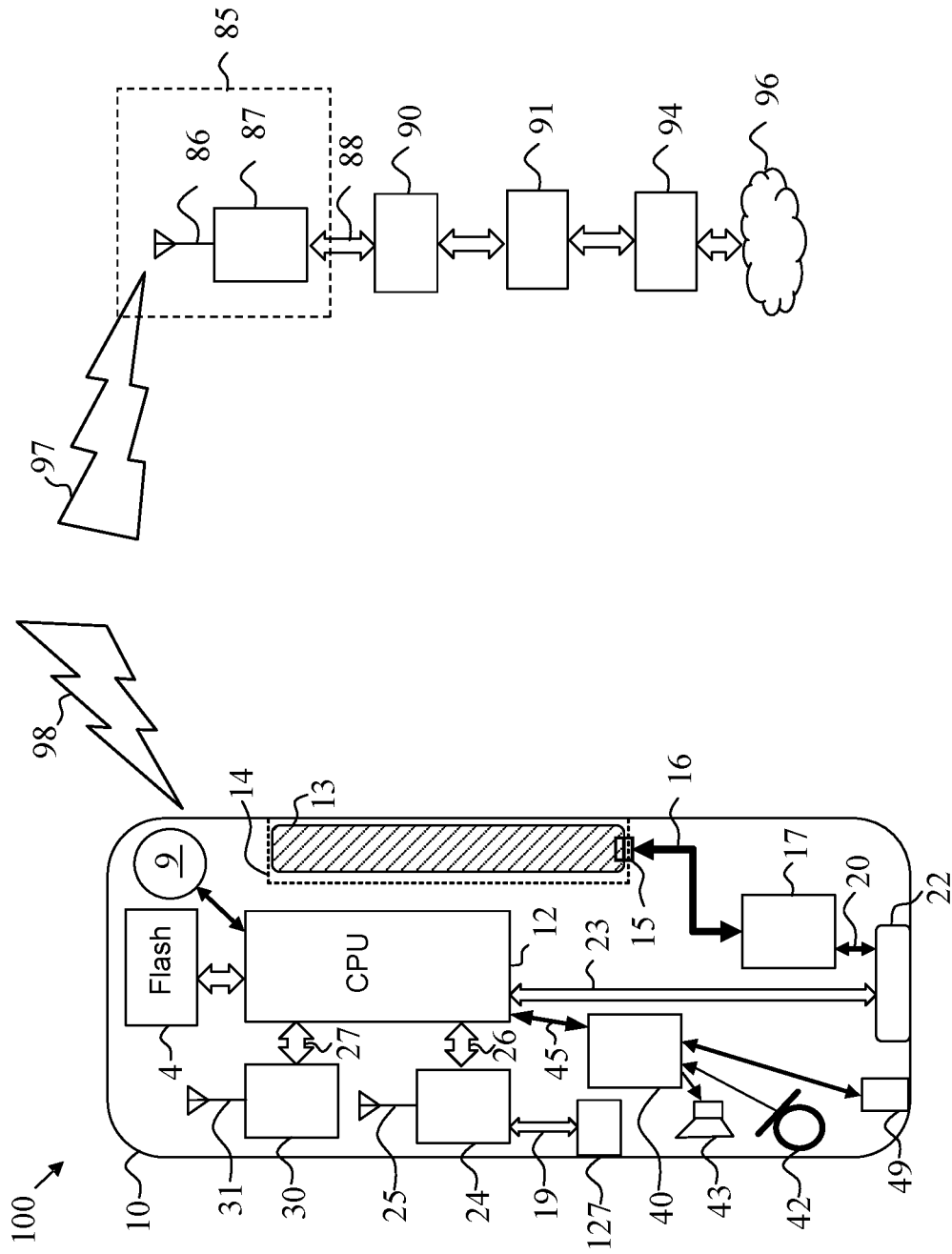

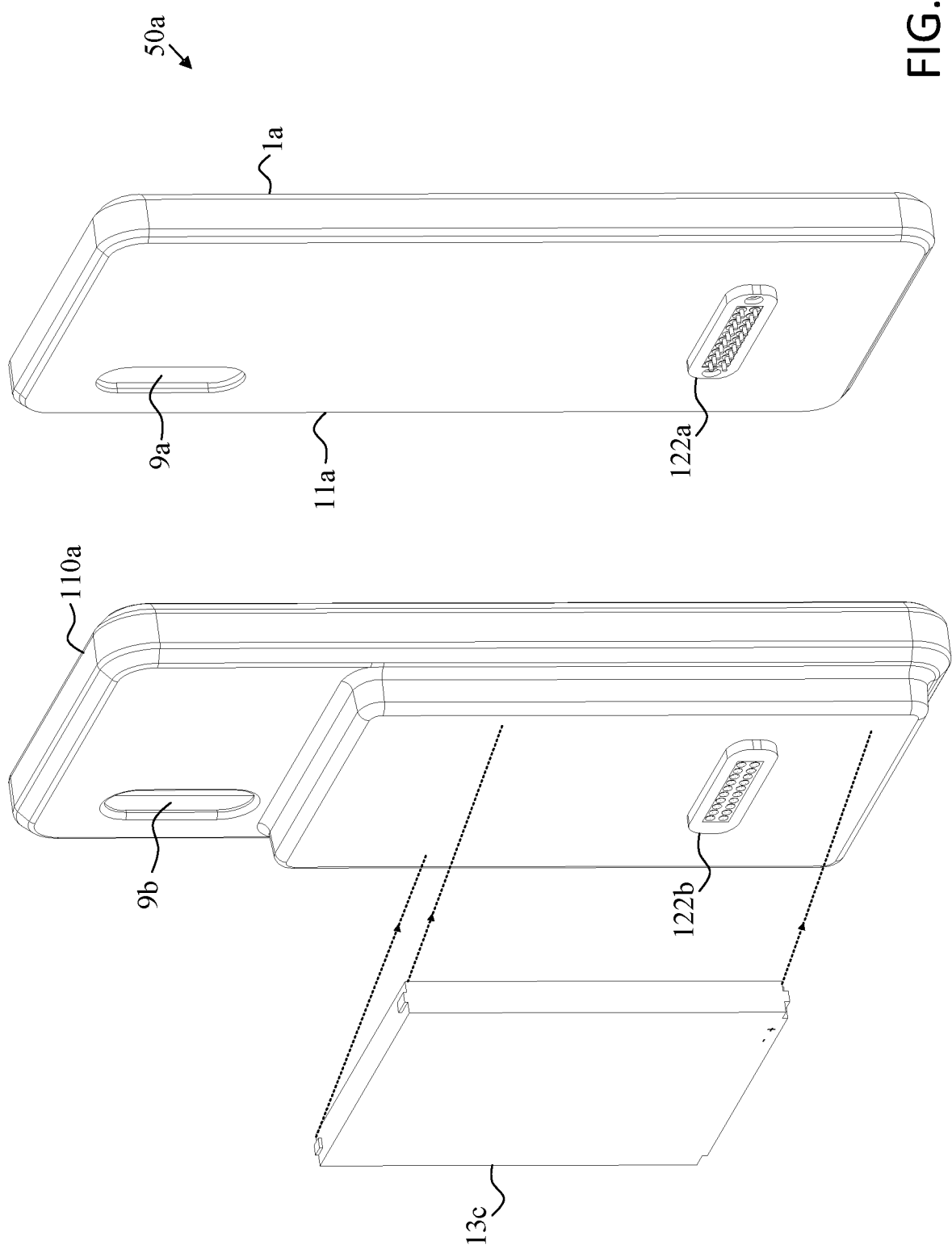

SECURED SMARTPHONE COMMUNICATION SYSTEM

FIELD OF THE INVENTION

The present invention relates to a smartphone system that provides high-security encrypted voice and data capabilities while using slightly modified smartphones. More specifically, the present invention relates to a standard smartphone device that is coupled with a security module comprising cryptographic functions to generate secure encrypted communication channels.

BACKGROUND OF THE INVENTION

Cellular smartphones are used by billions of people today. Some smartphone users are working for organizations that have special security requirements. These security requirements cannot be easily met by current cellular phone security solutions. Smartphones are an open platform that can be easily infected and even fully controlled by malicious code from remote sources.

In some smartphones these security applications are executed inside special partitions in the phone's Central Processing Unit (CPU) or System On a Chip (SOC) called "ARM TrustZone" or "Trusted Execution Environment" (TEE). This partition is a secure area of the main processor. It guarantees code and data loaded inside to be protected with respect to confidentiality and integrity. The TEE as an isolated execution environment provides security features such as isolated execution, integrity of Trusted Applications along with confidentiality of their assets. Although "ARM TrustZone" or TEE offers an execution space that provides a higher level of security, it is still vulnerable to multiple attacks on the smartphone.

In some prior art there is provided a jacket that is connected to the external data connector of the smartphone and the internal modem and RF chain including the antennas of the smartphone are blocked and bypass by external counterparts in the security jacket. The objective of the present invention is to overcome some of the limitation of this security jacket architecture.

SUMMARY OF THE INVENTION

According to an aspect of the present disclosed subject matter, a security insert for securing a smartphone communication system is provided. In some exemplary embodiments the security insert has wireless communication capabilities. Alternatively, the security insert does not have wireless communication capabilities and the smartphone's wireless communication capabilities are being used.

According to an aspect of some embodiments of the present invention there is provided a method for securing an off-the-shelf smartphone comprising the steps of: removing the off-the-shelf smartphone's battery from the battery compartment; inserting a security insert to the battery compartment, wherein the security insert comprises a cryptographic module; modifying off-the-shelf smartphone with at least providing a power and data connection to the security insert.

According to some embodiments of the invention, the method further comprises attaching an external power pack to deliver power to the off-the-shelf smartphone and the security insert.

According to some embodiments of the invention, the method further comprises disabling the cellular MODEM of the off-the-shelf smartphone.

According to some embodiments of the invention, the method further comprises at least one of or a combination of (a) disconnecting cellular MODEM from one or more cellular MODEM built-in antennas; (b) connecting the security insert to the cellular MODEM built-in antenna using miniature coaxial cables; and (c) creating hole in battery compartment or in smartphone body and pass through the hole the miniature coaxial cables.

According to some embodiments of the invention, the method further comprises removing or disabling original carrier SIM.

According to some embodiments of the invention, the method further comprises removing or disabling wireless functions of off-the-shelf smartphone.

According to some embodiments of the invention, the method further comprises at least one of or a combination of (a) disconnecting the wireless functions from one or more wireless functions built-in antennas; (b) connecting the security insert to the one or more wireless functions built-in antennas using miniature coaxial cables; and (c) creating hole in battery compartment or in smartphone body and pass through the hole the miniature coaxial cables.

According to some embodiments of the invention, the method further comprises at least one of or any combination of (a) blocking, removing or disabling flash memory slots; (b) loading alternative flash memory with a modified software image; (c) blocking, removing or disabling of one or more cameras.

According to some embodiments of the invention, the method further comprises inserting of a smaller volume battery in the battery compartment or integrating a smaller volume battery into the security insert.

According to some embodiments of the invention, the method further comprises modifying or replacing power delivery circuitry of off-the-shelf smartphone to provide at least one of or any combination of (a) powering of off-the-shelf smartphone and security insert from a smartphone docking connector; (b) providing voltage-conversion-free powering to off-the-shelf smartphone and security insert from the smartphone docking connector; and (c) powering of off-the-shelf smartphone from a security insert docking connector.

According to some embodiments of the invention, the method further comprises at least one of or a combination of (a) disconnecting data signals between the off-the-shelf smartphone and the smartphone docking connector; (b) connecting data signals between the security insert red bus to the off-the-shelf smartphone docking connector; (c) connecting data signals from the security insert black bus to the smartphone docking connector; and (d) dynamically switching, connecting or disconnecting, between data signals from the security insert red bus or black bus and the smartphone docking connector.

According to some embodiments of the invention, the method further comprises providing user interface operations to erase the secret keys of the cryptographic module.

According to some embodiments of the invention, the method further comprises adding a security insert docking connector on a back case of the off-the-shelf smartphone, wherein the security insert docking connector provides at least one of or any combination of (a) power delivery; (b) data transfer; and (c) RF signals transfer.

According to some embodiments of the invention, the method further comprises coupling additional power sources from at least one of or any combination of (a) a power pack connected to a smartphone docking connector; (b) a power-back jacket connected to a security insert docking connector located on a back case of the off-the-shelf smartphone; and (c) an external power source connected to a jacket docking connector.

According to some embodiments of the invention, the method further comprises installing modified high-security operating system software image, wherein the high-security operating system software image is configured to route all cellular outgoing data and all cellular incoming data via the cryptographic module such that cellular data exchange between the off-the-shelf smartphone and a cellular network is encrypted or decrypted by the cryptographic module.

According to an aspect of some embodiments of the present invention there is provided a secure communication system comprising: a modified off-the-shelf smartphone comprising a security insert in a battery compartment of the off-the-shelf smartphone, wherein the security insert comprises cryptographic module; a battery power source comprising at least one of or the combination of (a) a power-pack coupled to a smartphone docking interface of the off-the-shelf smartphone; (b) a power-pack jacket coupled to the security insert via a modified back case of off-the-shelf smartphone; (c) a battery integrated inside the security insert; and (d) a battery located in the battery compartment of the modified off-the-shelf smartphone wherein the battery occupies less than a half of the volume of this battery compartment, wherein the secure communication system wirelessly transmits outgoing cellular encrypted black data, which is encrypted by the cryptographic module, from the modified off-the-shelf smartphone to a cellular network, and decrypts, by the cryptographic module, incoming cellular black data receives from the cellular network to the modified off-the-shelf smartphone.

According to some embodiments of the invention, the encrypted black data is wirelessly transmit or receive through at least one of or any combination of (a) built-in antennas of the off-the-shelf smartphone; (b) antennas in smartphone's modified back case; (c) antennas in power-pack jacket; and (d) external antennas connected through a jacket docking connector.

According to some embodiments of the invention, the cryptographic module encrypts and decrypts using at least any one of or any combination of (a) AES; (b) ECC; (c) DES; (d) TripleDES; (e) RSA, (f) Twofish; and (g) Blowfish encryption standards.

According to some embodiments of the invention, the security insert comprises anti-tampering switch or sensor.

According to some embodiments of the invention, the system further comprises user interface elements to erase the secret keys of the cryptographic module.

According to some embodiments of the invention, the modified off-the-shelf smartphone comprises one or more wireless functions and the one or more wireless functions are removed or disabled in the modified off-the-shelf smartphone, the security insert comprises alternative similar wireless functions, and the usage of the wireless function by the modified off-the-shelf smartphone is performed by the alternative similar wireless functions of the security insert using at least one of or any combination of (a) built-in antennas of the off-the-shelf smartphone; (b) antennas in smartphone's modified back case; (c) antennas in power-pack jacket; and (d) external antennas connected through a jacket docking connector.

According to some embodiments of the invention, the wireless function is cellular MODEM.

According to some embodiments of the invention, the wireless functions are at least one of or any combination of (a) Wi-Fi; (b) Bluetooth; (c) GPS; and (d) NFC.

According to some embodiments of the invention, the secure communication system further comprises a public cellular infrastructure and a private cloud or network, the private cloud or network comprises matching cryptographic functions and having matching keys to encrypt data that is transmitted to the modified off-the-shelf smartphone through the public cellular infrastructure, or to decrypt data that is transmitted the modified off-the-shelf smartphone through the public cellular infrastructure.

According to some embodiments of the invention, the modified off-the-shelf smartphone comprises a back case and the back case of the off-the-shelf smartphone comprises a docking connector to provide at least one of or any combination of (a) power supply from external source; (b) data transfer with external source; (c) RF signals transfer with one or more external antennas.

According to some embodiments of the invention, the modified off-the-shelf smartphone and the security insert further comprises each a docking connector with a USB interface.

According to an aspect of some embodiments of the present invention there is provided a security insert for secure communication system comprising: an enclosure configured to be deployed in a battery compartment of an off-the-shelf smartphone; a cryptographic module; and an SIBC connector configured to transfer data between the security insert and the off-the-shelf smartphone; wherein the secure communication system transmits and receives encrypted data and the cryptographic module encrypts the transmitted data and decrypts the received encrypted data respectively.

According to some embodiments of the invention, the power source is an external power pack attached to a smartphone docking connector of the off-the-shelf smartphone.

According to some embodiments of the invention, the cryptographic module encrypts and decrypts using at least any one of or any combination of (a) AES; (b) ECC; (c) DES; (d) TripleDES; (e) RSA, (f) Twofish; and (g) Blowfish encryption standards.

According to some embodiments of the invention, the security insert is configured to receive user interface operations to erase the secret keys of the cryptographic module.

According to some embodiments of the invention, the security insert further comprises a cellular MODEM.

According to some embodiments of the invention, the security insert further comprises SIM card socket.

According to some embodiments of the invention, the security insert is configured to wirelessly transmit and receive encrypted black data through at least one of or any combination of (a) built-in antennas of the off-the-shelf smartphone; (b) antennas in smartphone's modified back case; (c) antennas in power-pack jacket; and (d) external antennas connected through a jacket docking connector.

According to some embodiments of the invention, the security insert further comprises at least one of or any combination of the following wireless functions: (a) Wi-Fi; (b) Bluetooth; (c) GPS; and (d) NFC.

According to some embodiments of the invention, the security insert comprises a security insert docking connector to provide at least one of or any combination of (a) power delivery from external power source; (b) data transfer with external source; (c) RF signals transfer with one or more external antennas; and (d) loading software, data or cryptographic keys.

According to some embodiments of the invention, the cryptographic module comprises a high-security side, connected to a high-security red bus, for exchanging sensitive data only; and a low-security side, connected to a low-security black bus, for exchanging encrypted data, the encrypted data is at least one of or any combination of (a) data to be decrypted by the cryptographic module; and (b) data encrypted by the cryptographic module.

According to some embodiments of the invention, the security insert comprises wireless functions, the wireless functions are coupled to the low-security black bus, and the off-the-shelf smartphone is coupled to the high-security red bus.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device, such as, a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic illustration of a cellular system in accordance with some embodiments of the present invention;

FIG. 2A is a view from a bottom left front observation point of view;

FIG. 2B is a view from a bottom right back observation point of view;

FIG. 7 is an exploded isometric view from back-left point of view of the smartphone illustrated in FIG. 5 according to an embodiment of the present invention;

FIG. 8A is a case where a cellular MODEM and the built-in antenna in the smartphone are far away from each other;

FIG. 8B is a case where the cellular MODEM and the built-in antenna of the smartphone are close to each other and there is enough space to add miniature RF connector;

FIG. 8C is a case where the cellular MODEM and the built-in antenna of the smartphone are close to each other and there isn't enough space to add miniature RF connector.

DESCRIPTION OF SPECIFIC EMBODIMENTS OF THE INVENTION

Figure 2B:
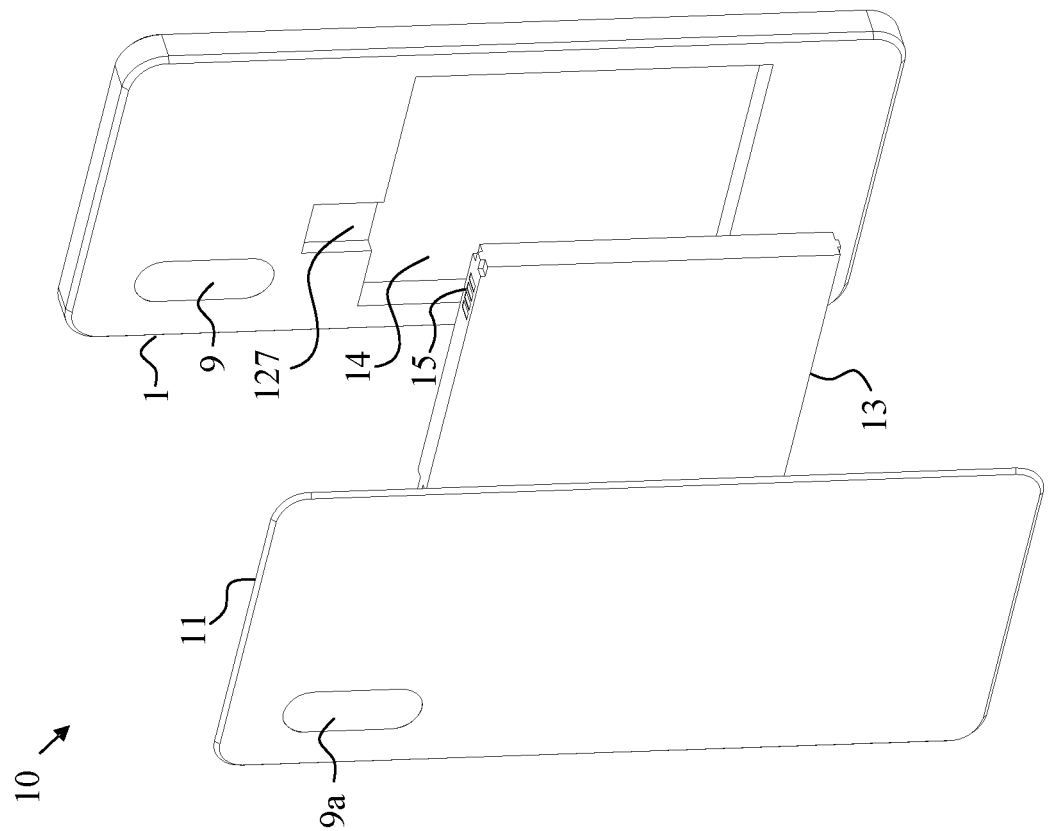
FIGS. 2A-2B are exploded isometric views of a typical smartphone in accordance with an exemplary embodiment of the invention.

As stated herein the term "smartphone" means any mobile electronic device with computing and communication capabilities, such as, mobile phones, notebooks, tablets, application specific terminals, personal assistant devices (PDAs) and the like.

As stated herein the term "red" means high sensitivity data and devices and functions for handling high sensitivity data, while the term "black" indicates low sensitivity data and devices and functions for handling low sensitivity data. Black (low sensitivity) data may be broadcasted wirelessly using standard cellular communication channel. Red (sensitive) data need to be kept within the red sections of the system, or be encrypted before exposed to the black section of the system.

As used herein, the term "connected" means a direct connection, such as, electrical, or mechanical connection between the things that are connected, without any intermediary components or devices. In case of electrical connection, the term connected may also be used for a connection through cables, connectors, wires, PCB traces, pins, switches or any other low ohmic resistance element that is used to establish galvanic connection between the things.

As used herein, the term "coupled" or "attached" means a direct or indirect connection, such as a direct electrical or mechanical connection between the things that are connected or an indirect connection, through one or more passive or active intermediary components or devices.

As used herein, the term "circuitry" means one or more passive and/or active components that are arranged to cooperate with one another to provide a desired one or more functions.

As used herein, the term "off-the-shelf smartphone" means a smartphone as purchased or as commonly available without modification, and the term "modified off-the-shelf smartphone" means a smartphone after modifications in accordance to embodiments of the present invention.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 schematically illustrates a cellular system 100 comprising an off-the-shelf smartphone 10 and a cellular communication infrastructure in accordance with some embodiment of the invention. A typical block diagram of off-the-shelf smartphone 10 is presented in this figure. As used herein, the term off-the-shelf smartphone means a commonly available in the market smartphone without modification or customization. Some of smartphone's 10 components were omitted in this figure to avoid cluttering. Off-the-shelf smartphone 10 comprises non-volatile memory, such as flash memory 4, to store the phone software image that includes the operating system, software applications and various system and user data. Flash memory 4 is coupled to CPU (Central Processing Unit) 12. CPU 12 may be ARM architecture or any other single or multi-core microprocessor or a SOC (System On a Chip). CPU 12 is coupled through interface bus 26 to the cellular MODEM (Modulator/Demodulator) 24 that contains among other components the baseband and the radio transceiver that are required to access the cellular wireless network through one or more antennas 25. More than one antenna may be required to work in different frequencies bands or to improve the quality and reliability of the wireless link (this function called antenna diversity or space diversity). cellular MODEM may support variety of cellular communication standards such $1^{st}$ to $5^{th}$ cellular generation standards, including for example, GSM, CDMA, 3GPP, UMTS, WiMAX, LTE, EV-DO, MBWA, 5G NR and the like. cellular MODEM may support future cellular wireless networks as well. Cellular MODEM 24 is coupled through lines 19 to a SIM (Subscriber Identity Module) card socket 127 to support user inserted SIM card. CPU 12 is further coupled through interface bus 27 to additional wireless receivers or transceivers 30 that is in turn coupled to one or more matching antennas 31. Additional wireless receivers or transceivers may be wireless LAN (Local Area Network), such as Wi-Fi, PAN (Personal Area Network), such as Bluetooth, navigation systems, such as GNSS (Global Navigation Satellite System) and GPS (Global Positioning System), NFC (Near-field communication) or any other standard wireless protocol supported circuitry.

CPU 12 is further coupled through serial interface 45 to audio CODEC or AFE (Analog Front End) 40 that is coupled to one or more microphones 42 and one or more speakers 43. Audio CODEC or AFE (Analog Front End) 40 may be further coupled to headphones jack 49 to enable connection of external wired headphones or headset. CPU 12 is further coupled through a docking interface 23 to a smartphone docking connector 22 usually located at the bottom of the phone 10. As used herein, smartphone docking connector, or in brief, docking connector is the main connector that the smartphone has in order to connect to a charger and/or peripheral devices. Typically, the connector is located at the bottom of the smartphone and a version of USB interface standard is used. The connector is mini/micro USB or USB type C connectors. Additionally or alternatively, other connector types are used and the docking connector may comprises from a plurality of separate connectors.

Power to smartphone 10 is supplied from rechargeable battery 13 that resides inside a battery compartment 14. A power connector 15 having one side on the battery compartment and the other side in the PCB of smartphone 10 is delivering the power between battery 13 and smartphone 10. This connector typically has springs, pogo pins or the like to make easy fast connection between the contacts on the battery and the connector side in smartphone 10. Connector 15 is coupled through power lines 16 to the power delivery circuitry 17 that is, in turn, coupled to the docking connector 22 via power lines 20. Docking connector 22 enables phone 10 operation from external charger. Additionally, docking connector 22 enables charging battery 13. If docking connector 22 is configured to support USB (Universal Serial Bus) OTG (On The Go) protocol such as USB 3.1, then the power delivery circuitry 17 may be used to detect the type of connected USB device to allow smartphone 10 to act as a USB device that receives power from an external device. Alternatively, the USB interface may allow smartphone 10 to act as a USB host that supplies power to an external entity that may be connected to docking connector 22.

Smartphone 10 cellular MODEM 24 transmits through antenna 25 packetized data 98 to a nearby cellular base-station 85 having one or more antennas 86 and radio transceiver 87. Similarly, base station 85 transceivers 87 transmits packetized data 97 to smartphone 10 antenna 25 through base-station antenna 86. Data received from smartphone 10 is passed from base-station 85 over a cellular carrier network backhaul 88 to mobile carrier core network servers 90. Similarly, data intended to the smartphone 10 is passed from the mobile carrier core network servers 90 via cellular carrier network backhaul 88 to the assigned base-station 85 to enable transmission 97 to the smartphone 10. Such data may include packetized voice or application data such as web-browser data.

Data from the Internet 96 is passing to phone 10 through a carrier packet gateway (PGW) 94, a mobile carrier Serving Gateway (SGW) 91 and to mobile carrier core network servers 90. Voice calls are diverted and routed through routers to different mobile carriers (not shown here) or to different callers on the same carrier network through the same cellular carrier network backhaul 88. Malicious code may infect smartphone 10 through the connection to the Internet 96 or through wireless LAN or another wireless interface 30. Malicious code may run on smartphone 10 CPU 12 and may be temporarily stored in RAM (Random Access Memory) or cache (not shown here) or permanently stored on flash 4. CPU 12 may run various intrusion detection or anti-virus applications. Still as CPU 12 lacks root-trust, it is possible that the malicious code will survive such applications and infect smartphone 10. Furthermore, various man-in-the-middle attacks on smartphone 10 are possible as voice and data transmitted 98 or received 97 by the smartphone 10 are not strongly encrypted or not encrypted at all. Attacker may send data to smartphone 10 or intercept the transmitted data 97 and 98. As modern smartphones are having multiple additional sensors (cameras, inertial sensors (not seen here) and GPS), it is possible that the remote attacker will operate these sensors to extract location, surrounding audio, video and other information that sensed by smartphone 10 sensors.

Since smartphone 10 has large local storage space on flash 4, remote attacker may want to access such data remotely to gain access to the user emails, credentials, documents, encryption keys etc. Some smartphones may have a removable flash memory for storing additional data. In some exemplary embodiments, the removable flash is removed, and/or its socket is disabled or removed. Alternatively, data encryption may be used to encrypt all or sensitive data on the removable flash memory.

Smartphone 10 may be equipped with one or more cameras 9. Additionally, smartphone 10 may be equipped with touch display, power-on button and optionally other buttons, such as, audio volume "+" and "−" buttons, PTT button and user programable buttons, additional sensors, such as, accelerometer, proximity sensor, compass, gyroscope and the like, and biometric authentication, such as fingerprint identification or the like. These elements are not shown in the figure. Optionally, smartphone may be rugged and sealed to comply with, for example, IP68, MIL-STD 810G standards and the like.

Figure 2A:
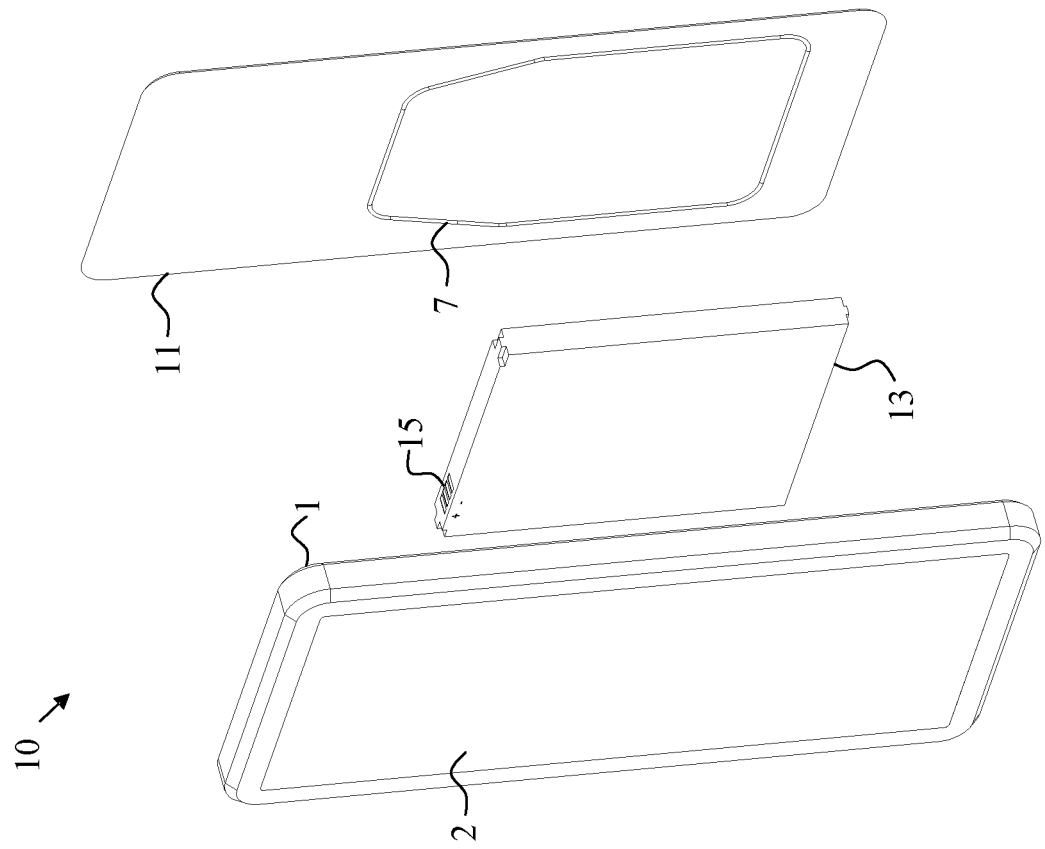

Reference is now made to FIGS. 2A and 2B. FIG. 2A and FIG. 2B are typical exploded isometric views of a typical smartphone 10 of FIG. 1. FIG. 2A is a view from a bottom left front observation point of view and FIG. 2B is a view from a bottom right back observation point of view. Smartphone 10 comprises three main assembly parts. Smartphone body 1, battery 13, and back case 11. Smartphone's body 1 comprises a touch screen 2 (seen only in FIG. 2A), and most of the elements and components shown in smartphone 10 block diagram in FIG. 1. In the back of smartphone 10 there is battery compartment 14 (seen only in FIG. 2B). Battery compartment 14 hosts battery 13. Battery 13 comprises the battery counter-side of connector 15. Optionally, on the internal side of back case 11 there is a sealing gasket 7 to seal the battery compartment. Such a sealing, seals completely smartphone 10 since other than battery compartment 14 all other part of Smartphone's body 1 are sealed. Besides battery compartment there is also a SIM card socket 127 to support user inserted SIM card. Smartphone's body 1 back side further comprises back camera 9 and the back case 11 comprises a transparent camera window 9a to enable camera view. Optionally a lens is integrated into camera window 9a.

Figure 3:
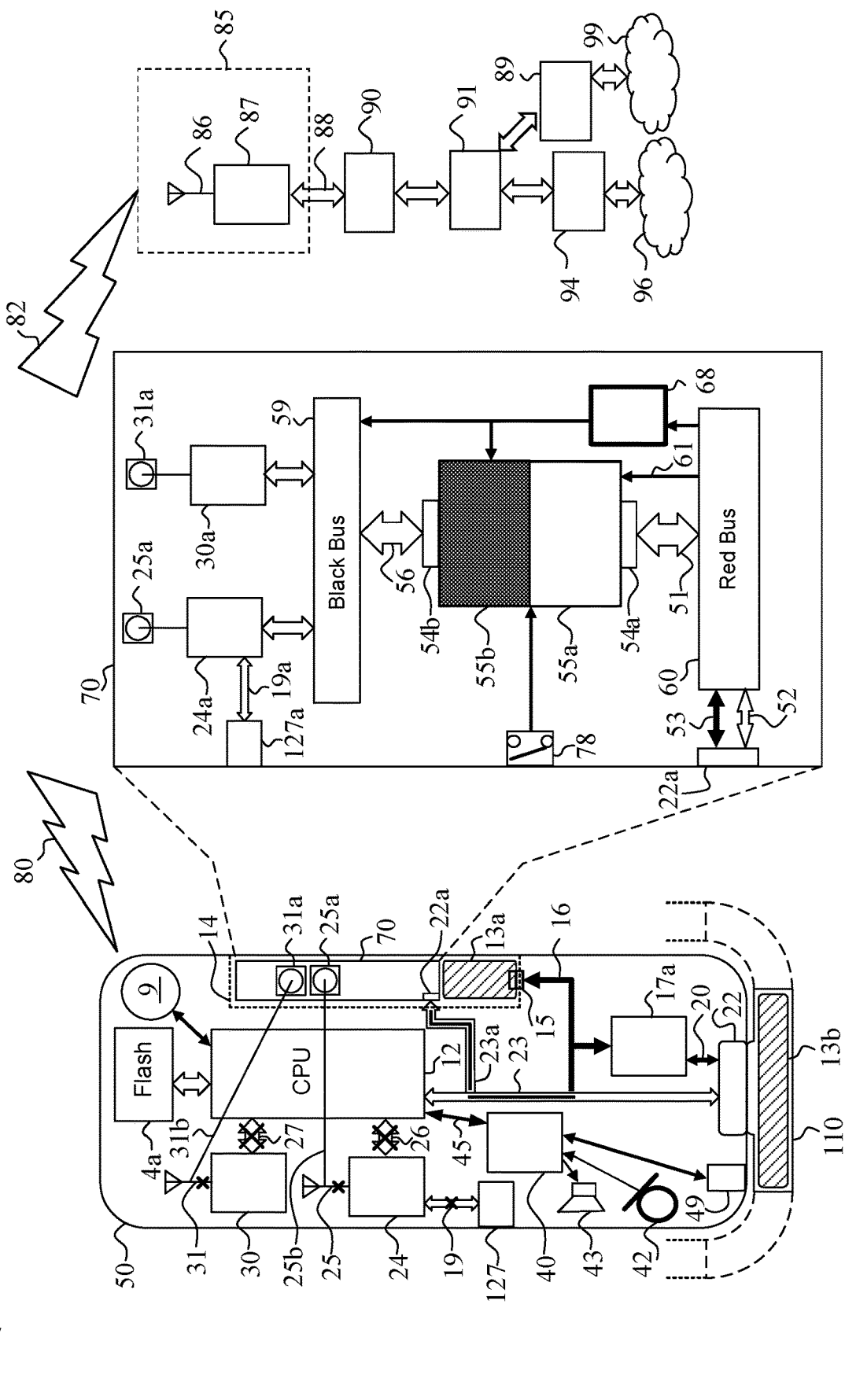
FIG. 3 is a block diagram of a secure communication system comprising "modified" smartphone in accordance with an exemplary embodiment of the invention.

Reference is made now to FIG. 3. FIG. 3 is a block diagram of a secure communication system 200 comprising "modified" smartphone 50 according to an exemplary embodiment of the invention. Smartphone 50 comprises a security insert 70 which is insertable in battery compartment 14. System 200 comprises a modified smartphone 50 having security insert 70 that has an enclosure configured to be deployed in battery compartment 14.

In this figure, smartphone 50 is a modified version of off-the-shelf smartphone 10 illustrated in FIG. 1. Optionally, smartphone 50 has a sealed rigid enclosure to meet harsh environmental conditions. In an exemplary embodiment of the invention, the original cellular communication capabilities in the modified off-the-shelf smartphone 50 are disabled. As alternative communication capabilities, secured cellular communication capabilities are enabled using a plug-in module security insert 70, that is inserted to the battery compartment 14. To evacuate a place for security insert 70, a modified smaller battery 13a may be used. Additionally or alternatively, external battery, for example, 13b is used. In an exemplary embodiment of the invention, battery 13a occupies less than a half of the volume of battery compartment 14.

In an exemplary embodiment of the invention, a power pack 110 is attached to connector 22 to compensate for the reduced capacity of battery 13a. Power pack 110 comprises battery 13b that supplies extended operation time between successive charging. Power pack 110 is attached as add-on to the lower part of smartphone 10 that comprises the combined data and power docking connector 22, which complies for example with USB interface standard. In an exemplary embodiment of the invention, power pack 110 extends the length smartphone 10. Additionally or alternatively, power pack 110 may extend to the sides (as illustrated in dashed lines in the figure), to the back or completely encloses smartphone 10 in such a way it still keeps the screen and buttons accessible to the user. Power pack 110 may be a case, a rugged case, a jacket, a flexible Snap-On rugged case or the like. In addition to its power supply feature, Power pack 110 may provide additional mechanical protection to off-the-shelf smartphone 10.

In an exemplary embodiment of the invention, the smaller battery 13a is integrated into security insert 70. In this case, security insert 70 is entirely filing the battery compartment 14. Alternatively, security insert 70 does not comprises battery at all and its power supply, as well as smartphone 50 power supply, are supplied fully by power pack 110 or other means of power sources as described later on.

Security insert 70 comprise Smartphone Insert in Battery Compartment (SIBC) connector 22a that duplicates the connections (or pins) of docking connector 22. To provide the signals and power to SIBC connector 22a modification to smartphone 50 is made and bus 23a is added to smartphone 50. SIBC connector 22a resides in battery compartment 14. In addition, Security insert 70 comprise connectors 31a and 25a. connectors 31a and 25a are miniature coaxial RF connectors such as U.FL, I-PEX MHF, IPAX, IPX, AMC, UMCC or the like. All this connection including the original battery connector 15 resides inside battery compartment 14 and connects between security insert 70 and smartphone 50 elements and PCBs that are typically resides in the smartphone body.

One or more or any combination of the following modifications are made or may be made to off-the-shelf smartphone 10 to make it modified smartphone 50:

1. Disabling cellular MODEM 24, for example, by disabling interface 26 to the CPU or by disabling or removing critical components enabling this function. One alternative to disable this function without removing components is to cut some traces that provide power, clock or data to the cellular MODEM 24 (as marked by x in the drawing).
2. Removing or disabling original carrier SIM 127 by cutting lines 19 (as marked by x in the drawing).
3. Blocking, removing or disabling flash memory slots (not marked in the figures).
4. Removing or disabling other wireless functions 30, for example, by disabling its CPU interface 27 (as marked in the drawing) or by disabling or completely removing this function or critical components in this function;
5. Loading alternative flash memory 4a with a modified software image to accept the removed or disabled functions and to remove unnecessary and/or unsecure applications, functions and settings; upgrading the OS to secured version, e.g., Knox secured kernel.
6. Removing battery 13 from the battery compartment.
7. inserting security insert 70, and optionally, inserting a reduced size battery 13a. Typically the reduced size battery occupies less than a half of the volume of battery compartment 14.
8. Modifying or replacing power delivery circuitry 17 with power delivery circuitry 17a to enable changes such as use of different battery and powering the modified smartphone and the security insert directly from docking connector 22. Additionally or alternatively, voltage boost function in power delivery circuitry 17*a* may be bypassed or modified to prevent unnecessary voltage up-conversion and down-conversion and to provides efficient power delivery to security insert 70. This modification may be done to allow security insert 70 and power pack 110 that is connected to docking connector 22 works together.

9. Disconnecting data signals from docking connector 22 in order to block red data from reaching docking connector 22. Additionally or alternatively, connecting between black data bus of security insert 70 and docking connector 22. Optionally, a selector that dynamically connects between either red bus 60 or black bus 59 and docking connector 22 or a switch that dynamically connects or disconnects between red bus 60 or black bus 59 and docking connector 22 may be used. In such case, depend on the type of external device and if a secure peripheral is connected, after proper authentication the red bus may be exposed to docking connector 22.

10. Providing data and power connection to battery compartment (via, for example, SIBC connector 22*a*) to allow additional (to battery connector 15) powering capabilities as well as data transfer capabilities.

11. Disconnecting cellular MODEM 24 from one or more antennas 25 and connecting miniature coaxial RF connectors 25*a* to antennas 25 using miniature coaxial cables 25*b*, the cables, optionally, pass through a new created hole 25*c* made in battery compartment 14 or in smartphone body.

12. Disconnecting additional wireless receivers or transceivers 30 from one or more matching antennas 31 and connecting one or more miniature coaxial RF connectors 31*a* to antennas 31 using miniature coaxial cables 31*b*, the cables, optionally, pass through a new hole 31*c* made in battery compartment or smartphone body.

13. In addition, further additional changes may be implemented as needed, for example, removing, blocking or disabling of one or more video cameras such as the front camera or back camera.

In this figure, and in the following figures, in the context of cryptography, red data designates plain text, which is un-encrypted classified data, while black data designates encrypted data that is unclassified and can be transmitted and received in unsecure media, e.g., over the air.

In this exemplary embodiment of the present invention modified smartphone 50 is having a mechanically and electrically attached security insert 70 comprising MODEM for secure wireless communication. Security insert 70 is inserted to battery compartment 14 of modified smartphone 50. This security insert 70 provides security functions to modified smartphone 50.

Modified smartphone 50 docking connector 22 is coupled to security insert 70 by SIBC connector 22*a* that is connected through additional bus 23*a*. additional bus 23*a* comprises both data bus and power bus. Inside security insert 70 SIBC connector 22*a* is divided to data bus 52, that may reflect data signals in data bus 22, and to power bus 53, that may reflect power lines of bus 20. In an exemplary embodiment of the invention, data bus 52 couples to the red bus 60 of security insert 70. Red bus 60 may be USB protocol or any other serial bus or parallel bus communication protocol that may interface with CPU 12 of smartphone 50.

Red bus 60 of security insert 70 is further coupled through the cryptographic module red side red bus data interface 51 and cryptographic module red side data interface 54*a* to a cryptographic module red side 55*a*. Cryptographic module red side 55*a* encrypts the data received from the modified smartphone 50. The result is black encrypted data stream at the cryptographic module black side 55*b*.

Similarly encrypted (black) data received from black bus 59 of security insert 70, is coupled through the cryptographic module black bus data interface 56, and the cryptographic module black side data interface 54*b* to the cryptographic module black side 55*b*. The generated decrypted (red) data from black bus 59 is transferred to modified smartphone 50 through the cryptographic module red side 55*a*, cryptographic module red side red bus data interface 51, red bus 60, data bus 52 and SI BC connector 22*a*.

As used herein, the term cryptographic module means the subsystem that perform the cryptographic functions such as encryptions and decryption and any supporting management function such as receiving, storing and handling the cryptographic keys. In an exemplary embodiment of the invention, cryptographic module comprises red bus 60, black bus 59, red bus data interface 51, black bus data interface 56, red side data interface 54*a*, black side data interface 54*b*, cryptographic module red side 55*a*, and cryptographic module black side 55*b*. Additionally or alternatively, other elements may added or removed from the cryptographic module or alternative architectures of implementing of cryptographic module might be used.

To indicate similar or identical elements in this document, the letter "x" following a numeral may stand for any letter such as "a", "b", etc. Cryptographic module 55*x* may use industry standard encryption algorithms having symmetric keys such as Advanced Encryption Standard (AES) with block size 128 or 256 or the like, asymmetric key encryption such as ECC (Elliptic curve cryptography), Data Encryption Standard (DES), TripleDES, RSA, Twofish, Blowfish or any other present or future cryptographic function or standard.

Optionally, cryptographic module 55*x* is coupled to anti-tampering switch or sensor 78 to enable detection of an attempt to tamper with cryptographic module 55*x* or to extract its secret keys. Upon detection of a tampering attempt by anti-tampering switch or sensor 78, the Cryptographic module 55*x* is entering secret keys erase cycle and record the event in the system log in non-volatile memory (not shown in this figure). It should be noted that small battery or super-capacitor may be needed to enable keys erase and anti-tampering functions to operate when the security pack 70 is unpowered.

Additionally or alternatively, cryptographic module 55*x* is further coupled to user interface elements that enables the user to perform user interface operations to erase the secret keys or other classified data that is stored in cryptographic module 55*x*. User interface elements might be an application activated and running on CPU 12 or coupling to the buttons of smartphone 50. To prevent false erase of the keys and classified data, typically, the user interface operation is at least simultaneous activation two buttons. Buttons such as, audio volume "+" and PTT may be used. The triggered condition of the user interface operation that trigger the erase sequence may be having the buttons pressed simultaneously for predefined time interval or multiple time in a short-predefined time interval. In an exemplary embodiment of the invention, special buttons on a modified version of back case 11 may be used. The buttons may be physically located under back case 11 and can be activated by pressing on specific location on a flexible location over the modified back cover. Additionally or alternatively, manual activation of erase sequence may be performed by opening the smartphone 50 back case 11 to activate anti-tampering switch or sensor 78 hence activating the erase sequence.

Cryptographic module red side 55a is powered by the red bus 60 through power lines 61 and power lines 58. Cryptographic module black side 55b is powered by the red bus 60 through a red to black power supply/filter 68. Red to black power supply/filter 68 is DC to DC power supply or LDO (Low Drop Out) regulator that have high PSRR (Power Supply Rejection Ratio) to reject noise induced by red data on the black power output rail. Additional filtration may be needed in red to black power supply/filter 68 to power the black bus 59 and in particular to prevent red data correlated noise to be induced into black data signals that are transmitted. In specific this filtration is needed to prevent or scientifically reduce red data leakages over transmitted data 80 being transmitted by modified smartphone 50 over the air.

In an exemplary embodiment of the invention, in addition to the power filtering other isolation technics and elements such as ground separation isolated data drivers and the like are used to isolate between the red section and the black section.

Black bus 59 is further coupled to cellular MODEM 24a that in turn is optionally coupled through SIM interface 19a to SIM card socket 127a. SIM card socket 127a may populated with a SIM card that its purpose is to support communication using cellular MODEM 24a. In modified smartphone 50, MODEM 24 is deactivated, so no local SIM is needed. It may be needed to modify the software of modified smartphone 50 to boot and operate without requiring the presence of a SIM card in SIM card socket 127. Cellular MODEM 24a is connected to one or more miniature coaxial RF connectors 25a. Connectors 25a are connected using miniature coaxial cables 25b to the built-in antennas 25 of smartphone 50. Antennas 25 are used to transmit data 80 and to receive data 82 over the air. Transmit data 80 and receive data 82 are black data, e.g., encrypted data. In an exemplary embodiment of the invention, MODEM 24a may be completely different or with different version of MODEM 24. In specific, MODEM 24a may be upgraded version of MODEM 24, e.g., MODEM 24 may be $4^{th}$ generation cellular MODEM while MODEM 24a may be $5^{th}$ generation cellular MODEM. Additionally or alternatively, MODEM 24a may work in different frequency bands or may work in wider frequency band.

Optionally, black bus 59 is further coupled to additional wireless functions 30a such as GPS, Wireless LAN or Wi-Fi, Bluetooth, NFC etc., that in turn coupled to one or more miniature coaxial RF connectors 31a. Connectors 31a are connected using miniature coaxial cables 31b to the built-in antennas 31 of smartphone 50.

As used herein the term wireless functions mean any function that transmit and/or receive electromagnetic signals through the air using one or more antennas. Wireless function may involve transmitting and/or receiving digital data or analog signals. Wireless function may include any type of digital bidirectional network communication such as PAN, LAN or WAN, receive only communication application such as radio or TV broadcasting, navigation system and the like, or transmit only system such as beacon transmissions for location of the device by search and rescue forces.

In an exemplary embodiment of the invention, additional wireless functions 30a may be coupled to the red bus 60 instead of the black bus 59 if the data transmitted or received by additional wireless functions 30a is considered red. An example for such optional configuration would be a red Near-Field Communication (NFC) reader that may be used for secret key loading.

In an exemplary embodiment of the invention, integrated version of rechargeable battery 13a may be coupled to the black bus. In this case power bus 53 will be connected to black bus 59 and power supply/filter 68 will deliver power from the black bus to the red bus and cryptographic module red side 55a.

Cellular MODEM 24a of Security insert 70 transmits packetized data 80 to a nearby cellular base-station 85 having one or more antennas 86 and radio transceiver 87. Similarly, base station 85 transceivers 87 transmits packetized data 82 to the smartphone 50 antennas 25 through base-station antenna 86. Data received by transceivers 87 is passed from base-station 85 over the cellular carrier network backhaul 88 to the Mobile carrier core network servers 90. Similarly, data intended to the security insert 70 is passed from mobile carrier core network servers 90 via cellular carrier network backhaul 88 to the assigned base-station 85 and through transmission 82 to Cellular MODEM 24a of security pack 70. Such data may include packetized voice or video, application data and the like.

In an exemplary embodiment of the invention, in system 200, unlike in system 100 shown in FIG. 1, the mobile carrier diverts the data transmitted to and received from security insert 70 to a private cloud 99 instead of the public cloud 96 (the internet). This diversion may be done by mobile carrier Serving Gateway (SGW) 91 as shown in this figure or by the carrier core network servers 90. Data is passed through a cryptographic module, appliance or server 89 having matching keys and cryptographic functions to those used by cryptographic module 55x of security insert 70. Private cloud 99 may be LAN, WAN (Wide Area Network) or any other red network that is coupled to the organization operating the red network. This arrangement prevents internet 96 data from reaching security insert 70. It also makes man-in-the-middle attacks or data reception much harder as the data is encrypted by an external cryptographic device that is less vulnerable compared to smartphone 10 of FIG. 1 above. Modified smartphone 50 may include one or more Voice Over IP (Internet Protocol) that enable secure calls between modified phones 50 with security inserts 70 or from the organization cloud 99 IP phones or computers to modified smartphones 50 and vis versa.

In an exemplary embodiment of the invention, each security insert 70 is using different cryptographic key so information from private cloud 99 targeted to each modified phone can only be decrypted by the specific modified phone. Additionally or alternatively, different cryptographic function can be used by different groups of modified phones 50.

In an exemplary embodiment of the invention, security insert 70 does not comprise additional wireless functions 30a. all other wireless function are providing by modified smartphone 50. Accordingly, items 4, 12 in the modification list above, related to disabling other wireless functions 30 are not performed.

In an exemplary embodiment of the invention, security insert 70 does not comprise Cellular MODEM 24a. Accordingly, items 1, 2 and 11 in the modification list above, related to disabling Cellular MODEM 24 are not performed. Red data from CPU 12 are routed to the red bus and encrypted using cryptographic module 55x. The black data from the black bus is returned to CPU 12, then transferred to cellular modem 24 and transmitted via antennas 25. In the opposite communication data flow, black data received by cellular MODEM 24 is transferred to the black bus of cryptographic module 55x and the decrypted data in the red bus is transferred back to CPU 12. This exemplary embodiment of the current invention is considered to be less secure than an embodiment having the MODEM inside the security insert 70. Nevertheless, such implementation reduces the cost and the complexity of the security insert as well as the reduce the amount of modification in smartphone 50 hence may be used in scenarios were the required security is less severe and the security solution price is important.

In an exemplary embodiment of the invention, one or more wireless functions are disabled in the modified off-the-shelf smartphone and security insert 70 comprises additional wireless functions 30a comprises alternative similar wireless functions wherein the usage of the wireless function by the modified off-the-shelf smartphone is performed by the security insert using at least one of or any combination of (a) built-in antennas of the off-the-shelf smartphone; (b) antennas in smartphone's modified back case; (c) antennas in power-pack jacket; and (d) external antennas connected through a jacket docking connector.

Figure 4:
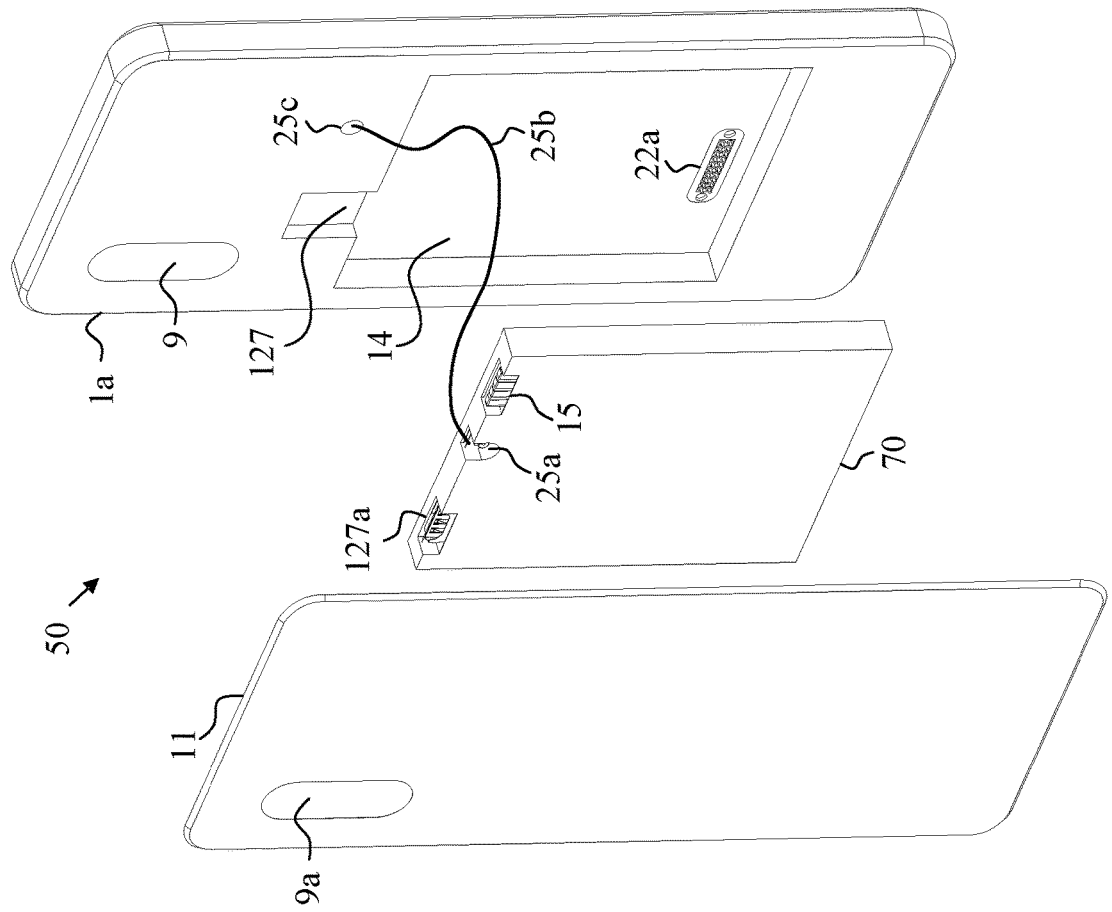
FIG. 4 is an exploded isometric view of a modified smartphone with security insert in accordance with an exemplary embodiment of the invention.

Reference is made now to FIG. 4, FIG. 4 is an exploded isometric view of modified smartphone 50 with security insert 70. Smartphone's body 1a is a modified smartphone comprises one or more modification listed above. In specific, shown in the figure, SIBC connector 22a reside in battery compartment 14. Back case 11, back camera 9 and camera window 9a are the same as in off-the-shelf smartphone 10 shown in FIGS. 2A and 2B. Battery compartment 14 contains, instead of battery 13, Security insert 70. Security insert 70 interfaces with a match connector (not shown in the figure) to SIBC connector 22a. Additionally or alternatively, security insert 70 comprises power connector 15 to deliver power to/from the insert to the modified smartphone 50. Security insert 70 comprises SIM card socket 127a. The user may insert a SIM to SIM card socket 127a before inserting security insert to battery compartment 14. Alternatively, Security insert 70 may be connected to original SIM card socket 127. Furthermore, security insert 70 comprises miniature coaxial RF connector 25a to be connected to internal antenna 25. The connection to the antenna is performed using miniature coaxial RF cable 25b entering the built-in antenna 25 that located inside Smartphone's body 1a via a hole 25c. It is worth to note that in case the original smartphone 10 have sealed case 11, hole 25c is in the area sealed by sealing gasket 7 so modified smartphone 50 keeping the same sealing quality as original smartphone 10. In an exemplary embodiment of the invention, a plurality of miniature RF connectors, e.g. 31a, and a plurality of miniature coaxial RF cables and holes are provided in modified smartphone 50.

Figure 5:
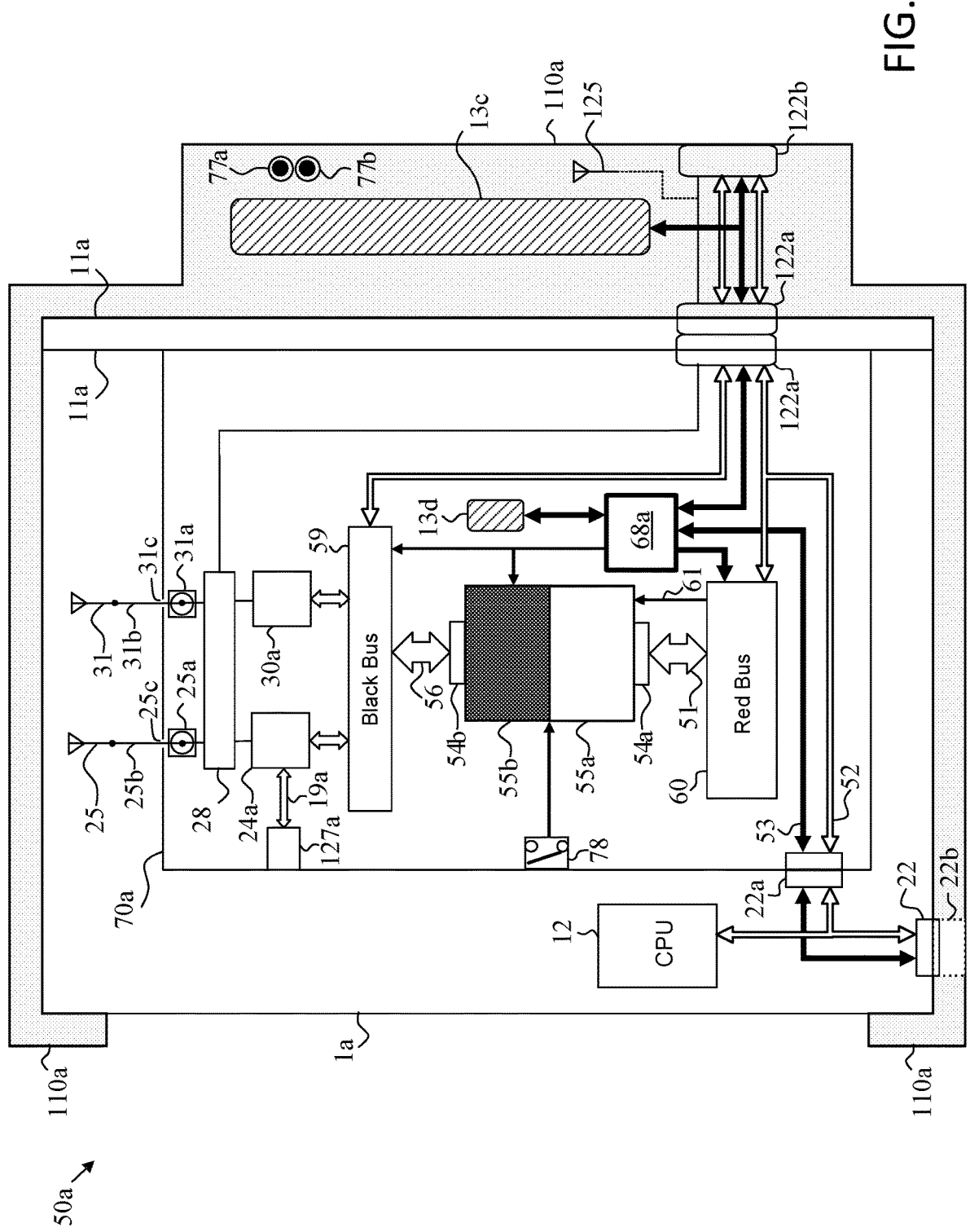
FIG. 5 is a block diagram of a modified smartphone in accordance with another embodiment of the invention.

Reference is made now to FIG. 5, FIG. 5 is a block diagram of another embodiment of a modified smartphone 50a with a security insert 70a and power-pack jacket 110a. Modified smartphone 50a comprises modified smartphone base 1a wherein its battery compartment 14 contains security insert 70a. The back side of smartphone base 1a is closed by back case 11a. The smartphone body (including insert 70a and back case 11a) is enclosed by a flexible edge power-pack jacket or power-pack snap case 110a that wraps the smartphone and provides additional power supply to modified smartphone 50a. In addition, power-pack jacket 110a may provide additional mechanical protection and robustness for modified smartphone 50a. Power-pack jacket 110a may be constructed in a form of a protective case having a cavity into which the modified smartphone 50a is inserted such that the touch-screen of the modified smartphone 50a is exposed. Power-pack jacket 110a comprises battery 13c to provide the power to modified smartphone 50a. In order to deliver the power from battery 13c to security insert 70a and smartphone base 1a, back case 11a comprises a security insert docking connector 122a. Security insert docking connector 122a resides in case 11a and connects between security insert 70a and power-pack jacket 110a. From the inner side of case 11a, connector 122a connects to security insert 70a and from the outer side of back case 11a, connector 122a connects to power-pack jacket 110a. Optionally, security insert docking connector 122a extends to the outer side of power-pack jacket 110a by a jacket docking connector 122b. In an exemplary embodiment of the invention, battery 13c is identical to battery 13 of off-the-shelf smartphone 10. Optionally during the modification process battery 13 is removed from battery compartment 14 and placed in power-pack jacket 110a. Alternatively, battery 13c has different type and/or size than battery 13. Battery 13c may comprise a plurality of batteries. Optionally, back case 11a has sealing property that are similar to back case 11 and security insert docking connector 122a is a sealed connector hence modified smartphone 50a have environmental protection similar to smartphone 10. Power-pack jacket 110a edges may be made from rubber, flexible plastic or other flexible material. Power-pack jacket 110a can snap on the smartphone body (including insert 70a and back case 11a) similar to other Snap-On cases known in the art. This feature enables a quick replacing of the battery by a user, e.g., a soldier, by a quick removal of the power-pack jacket and replacing it with other fully charged power-pack jacket. Power-pack jacket 110a comprises bottom hole 22b in the jacket to allow access to docking connector 22. Charging of battery 13c as well as battery 13d may be performed using smartphone docking connector 22 or jacket docking connector 122b. In an exemplary embodiment of the invention, power supply to the smartphone charging of batteries 13a-13d may be performed using connector 122a or connector 122b. Security insert 70 may power the connected modified smartphone 50 to support its operation and charging functions. Power to security insert 70a red bus 60 may be supplied through smartphone docking connector 22 or jacket docking connector 122b that may support USB OTG interface or any other standard or non-standard protocol for power delivery.

Smartphone docking connector 22 as well as security insert docking connector 122a and jacket docking connector 122b may be used to transfer data between peripheral devices, such as, extended user interfaces such as keyboards, pointing device, displays, and the like, external storage devices, external communication devices, external sensors devices, another smartphone, mobile computer, wall charger and the like. In an exemplary embodiment of the invention, the external device connected to docking connectors 122a or 122b may be an additional red laptop, tablet, phone, or proprietary device that operates in parallel on the same power source. Docking connectors 122a and 122b comprise red data interface and therefore may be used with secure devices running red (high security, unencrypted) applications. Such connection may allow the security pack 70a to provide security and communications services to the additionally connected red device (not shown in the figure).

It should be noted, that while smartphone docking connector 22 is a standard smartphone connector, such as USB type C connector, docking connectors 122a and 122b are typically more rigidized connectors that are more suitable for harsh field condition and more suitable for industrial and military applications. Docking connectors 122a and 122b may comply with environmental requirement such as IP68, MIL-STD-810 or the like as well as connector specific standards such as MIL-C-26500 standards or the like. Docking connectors 122a and 122b are designed for fast docking and fast release of the smartphone.

Security insert 70a is similar to security insert 70 having the same block diagram of the cryptographic module including black bus 59 and red bus 60 and all elements (51, 54a, 55a, 55b, 54b and 56 in between these buses. The power supply/filter/management block 68a of security insert 70a comprises more functions. In addition, to the function to deliver the power to red bus 60 and black bus 59 of the cryptographic module while ensuring high PSRR (Power Supply Rejection Ratio) between the buses in order to reject noise induced by red data on the black power output, power block 68 is connected to several power sources and manage all combination of power delivery and power charging modes. The power delivery scheme may be dynamic and may be decided based on the actual configuration and condition of each power source and power sink. Power block 68a may negotiate the power delivery with other entities in the system using interfaces of connectors 22, 22a, 122a and 122b (for drawing clarity, the actual lines are not shown in the figure). Power block 68a can supply or consume power from the following ports: (1) docking connector 22 and any power pack that might be connected to it, (2) battery 13c of power-pack jacket 110a through security insert docking connector 122a, (3) external device, for example, power from a vehicle power system that power pack jacket 110a is docking to through jacket docking connector 122b, and (4) internal battery 13d.

Security insert 70a comprises battery 13d. Battery 13d typically used for critical functions and power block 68a typically ensure that it recharged to full state when external power is provided. Power block 68a have power management functions that shut down power to certain units when power capacity level of battery 13d fall under a specific threshold. For example, power block 68a may shut down cryptographic module and wireless modem in security insert 70a. Additionally or alternatively, power block 68a may shout down power to smartphone body 1a. Power block 68a may keep alive critical functions, such as, any one of or any combination of the following critical functions: (1) power block 68a own functioning to enable the negotiation and setup to establish power delivery when new power source such as charger or power pack are coupled to the system, (2) functions related to secret keys erase activated by tampering switch or by user activation, (3) function of low data rate critical wireless control channel, (4) sensitive sensors in the system such as GPS system (such sensor might be activated in a reduced rate to save power), and (5) any other similar critical functions.

As in security insert 70, security insert 70a might comprises tampering switch 78. Optionally, in addition, power pack jacket 110a comprises user interface to manually trigger erase of the secret keys stored in the cryptographic module. For example, power pack jacket 110a may have two buttons 77a and 77b located on an accessible section of the power pack jacket 110a enclosure. For example, pressing simultaneously buttons 77a and 77b for a predetermined time will trigger the secret keys erase cycle.

As in security insert 70, security insert 70a have cellular MODEM 24a, SIM card socket 127a, and additional wireless functions 30a, however, in addition, security insert 70a comprises antenna switch 28. Antenna switch 28 selects the antennas that cellular MODEM 24a and additional wireless functions 30a are connected with. Any antenna port of cellular MODEM 24a and additional wireless functions 30a can be selected to be connected either to internal smartphone's built-in antennas 25 and 31 or to external antennas that are connected via special RF connection in security insert docking connector 122a. The connection from antenna switch 28 to smartphone's built-in antennas 25 and 31 is done through miniature coaxial RF connectors 31a and 25a that are connected to miniature coaxial cables 25b and 31b. Optionally, miniature coaxial cables 25b and 31b pass through holes 25c and 31c that are made in smartphone body 1a. In an exemplary embodiment of the invention, pass-through holes 25c and 31c are made inside battery compartment 14. Alternatively, miniature coaxial cables 25b and 31b pass through original openings existing in smartphone body 1a, (for example, openings that exists inside the battery compartment 14) that are covered by back case 11 or 11a. Sealing of modified smartphone is kept by having holes 25c and 31c inside the area that protected by sealing gasket 7. The connection from antenna switch 28 to external antennas is made by special RF connection in security insert docking connector 122a. Optionally, antennas 125 may be fabricated or printed inside or over power pack jacket 110a. Additionally or alternatively, external antenna, e.g., antennas installed on a military vehicle or antennas installed on a backpack carried by a soldier, may be connected using jacket docking connector 122b that replicate the RF pins of security insert docking connector 122a. Additionally or alternatively, antennas 125 may be located, embedded or printed in modified back case 11a. In an exemplary embodiment of the invention, external antenna might be a GPS antenna. Additionally or alternatively, external antenna might be tactical VHF antenna, antenna mounted on telescopic mast, high gain antenna with antenna rotator or any other kind of antenna arrangement that can gain performance from the extra space capabilities of external antenna.

Optionally, security insert docking connector 122a of security insert 70a comprises a connection to black bus 59 to enable add on devices connected to the docking connectors 122a or 122b to the cryptographic module or the wireless function of security insert 70 directly. This function is useful in the case where the smartphone 50a is docking inside a vehicle equipped with other computing equipment that can share resources and can interoperable with smartphone 50a.

In an exemplary embodiment of the invention, the functions of docking connectors 122a and 122b may be split to several connectors and other functions to the connectors may be added. Optional functions may include function such as: (a) providing power for charging the batteries 13a-13d; (b) exchanging red data; for example by having red USB interface (c) exchanging black data; (d) commanding or reprogramming smartphone 50a; (e) commanding or reprogramming security insert 70a; (f) transfer digital or analog audio and/or video stream; (g) uploading encryption keys; and (h) transfer RF signals to/from antennas or other RF sources or sinks. The separate connectors (not seen in these figures) may use same or different connector types and use same or different communication protocols.

Figure 6:
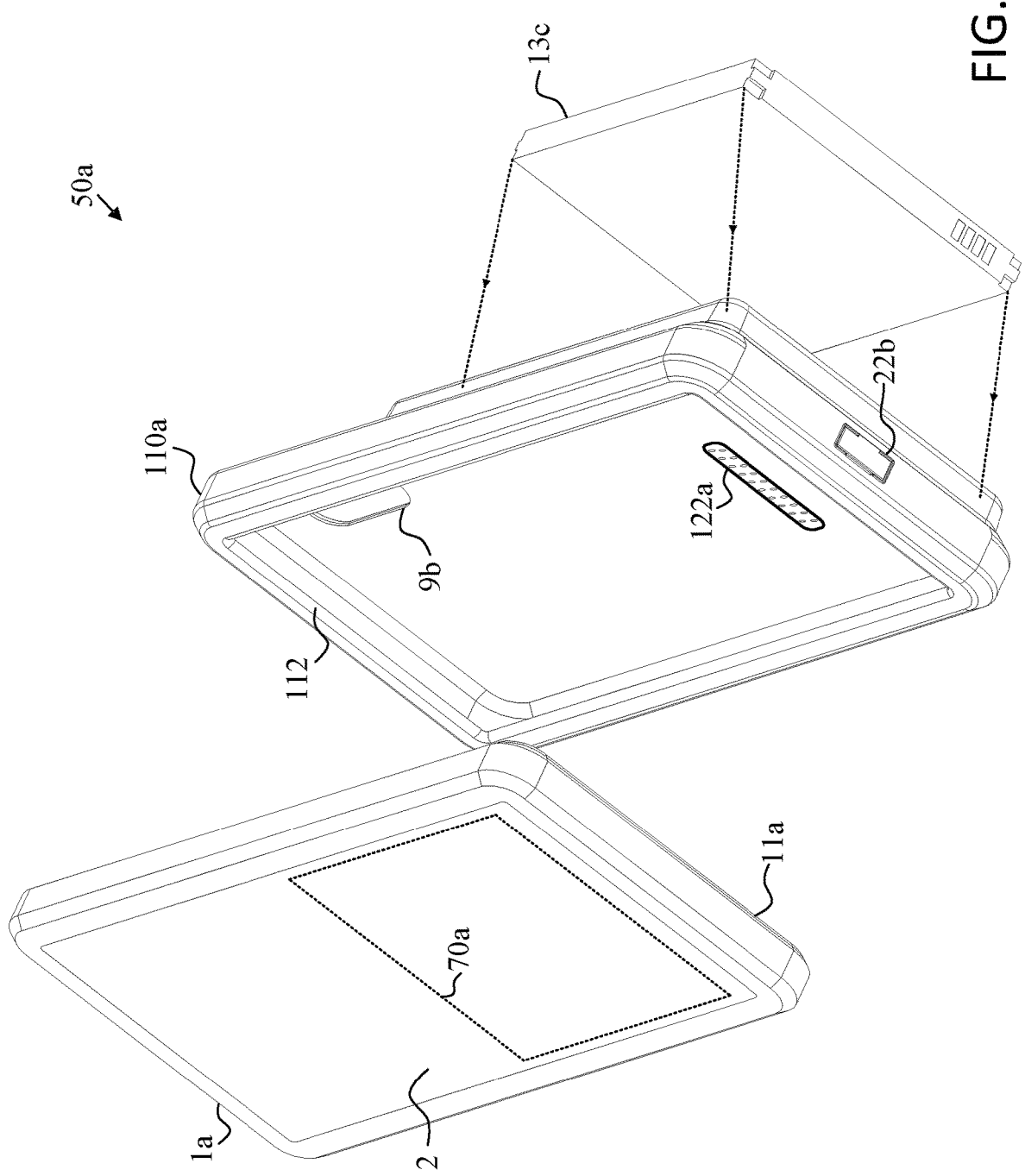
FIG. 6 is an exploded isometric view from front-left-bottom point of view of the smartphone illustrated in FIG. 5 according to an embodiment of the present invention.

Reference is made now to FIG. 6. FIG. 6 is exploded isometric views of smartphone 50a of FIG. 5. The view is taken from front-left-bottom side of smartphone 50a. Exploded modified smartphone 50a view comprises three parts: body 1a, power-pack jacket 110a and battery 13c. smartphone body 1a comprises the front touchscreen area 2. The portion of smartphone body 1a contains security insert 70a (illustrated by dashed line in the figure) resides on the battery compartment 14 and back case 11a. Power-pack jacket 110a have flexible edges 112 to allow quick and easy attachment and detachment of smartphone body 1a portion with power-pack jacket 110a. In another exemplary embodiment of the invention, power-pack jacket 110a is rigid and the smartphone body 1a portion slides into the jacket and optionally additional locking mechanism is used to lock body 1a into the jacket. Power-pack jacket 110a comprises security insert docking connector 122a on the inner side of the jacket. In another exemplary embodiment of the invention, power-pack jacket 110a is made of plastic, rubber, metal or any combination of thereof. Additionally or alternatively, any other solid or flexible materials may be used. The jacket side of security insert docking connector 122a is matched with the back case 11a side of connector 122a that is hidden in the figure. The connection is done simply by snapping the smartphone body to the jacket without any additional operation to ensure the connection. This may be done by pogo pins and spring connection or the like. Power-pack jacket 110a comprises a camera window 9b that together with camera window 9a allow clear view for camera 9. The third part in this exploded view id battery 13c. Battery 13c reside inside the prominent portion of power-pack jacket 110a as illustrated in the figure by the arrowed dashed lines.

Reference is made now to FIG. 7. FIG. 7 is exploded isometric views of smartphone 50a of FIG. 5. The view is taken from back-left side of smartphone 50a. In this view you can see back case 11a camera window 9a, back case 11a and jacket docking connector 122b that was hidden in the view of FIG. 6. Prominent portion of power-pack jacket 110a where battery 13c reside can be seen better as well.

Figure 8C:
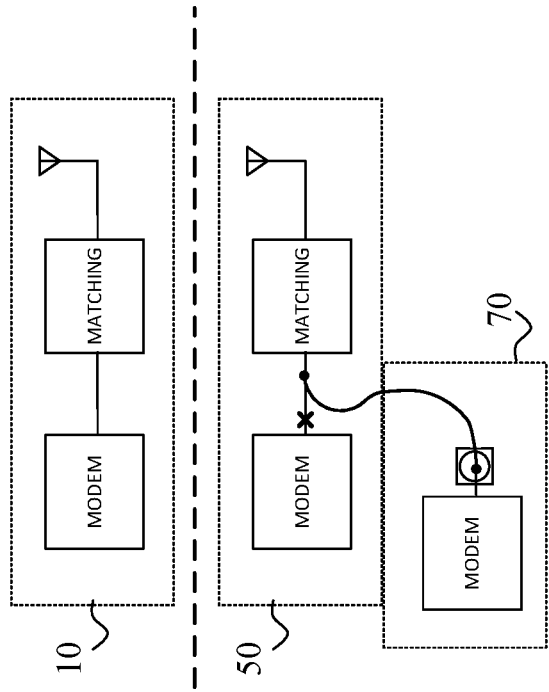
FIGS. 8A-8C are simplified illustrations of the modification needed for connecting RF signals from a security insert to a smartphone's built-in antennas in accordance with some embodiments of the present invention.
Figure 8B:
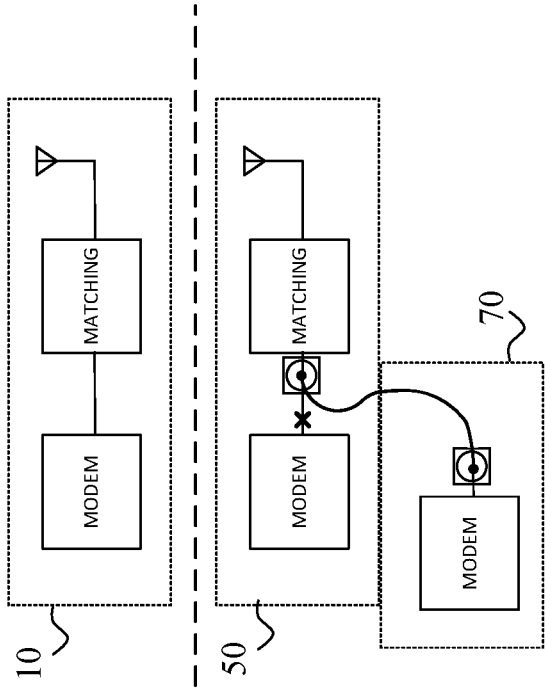
Figure 8A:
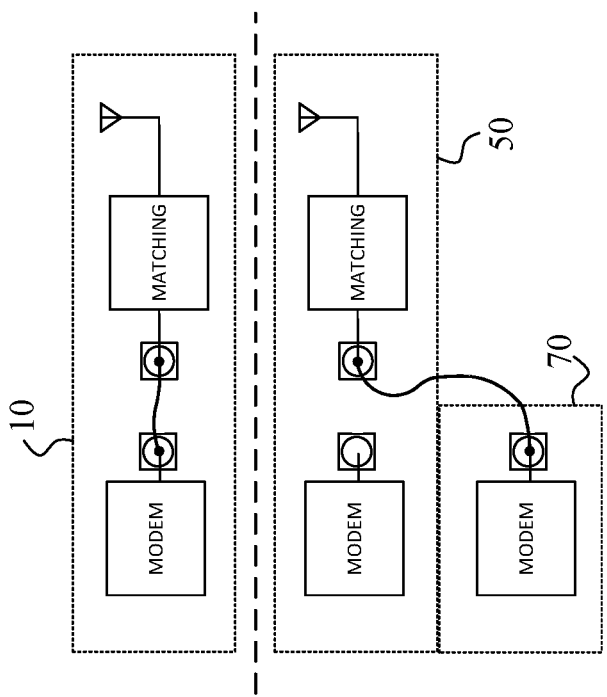

FIGS. 8A-8C illustrate the types of modification needed for connecting the RF signals from the security insert 70 to the built-in antennas (25, 31) of modified smartphone 50. In the top section of each of the figures the built-in antenna type in off-the-shelf smartphone 10 is illustrated.

In FIG. 8A the cellular MODEM and the antenna in smartphone 10 are far away from each other. smartphone 10 comprises two miniature RF connectors one close to the cellular MODEM and one close to the matching circuit that is coupled to the built-in antenna. Between the two miniature RF connectors there is miniature coaxial cable. In the modified version of the smartphone, i.e., in smartphone 50 a simple modification is performed. The modification is simply replacing the miniature coaxial cable so that the coaxial cable far end from antenna is connected to the miniature RF connector of the cellular MODEM of security insert 70.

In FIG. 8B and FIG. 8C the cellular MODEM in smartphone 10 is close to the antenna and the connection between the MODEM and antenna matching circuitries are made by traces on the PCB. In some cases, as illustrated in FIG. 8B there is enough space to make modification in the PCB and add (by soldering) miniature RF connector that feed the matching circuitry. In this case the modification will be to disconnect the antenna traces from the MODEM, add a miniature RF connector connected to the matching circuitry and connect the miniature coaxial cable so that the coaxial cable far end from antenna is connected to the miniature RF connector of the MODEM of security insert 70.

In FIG. 8C the space in the PCB of smartphone 10 does not allow adding miniature RF connector in front of the matching circuits. In this case the near-to-antenna end of the cable is connected directly by soldering the coaxial cable inner and outer conductors to the traces of the PCB and connecting coaxial cable far end from antenna to the miniature RF connector of the cellular MODEM of security insert 70. The traces before the connecting point of the cable in the PCB is catted as illustrated in the figure.

Any modification illustrated on these figures for modified smartphone 50 is applicable to modified smartphone 50a as well as to any other variant of modified phone in accordance with the present invention.

Any elements and functions illustrated on these figures for security insert 70 is applicable to security insert 70a and vice versa, as well as to any other variant of security inserts in accordance with the present invention.

Docking to Vehicle or Stationary Docking Station

Figure 9:
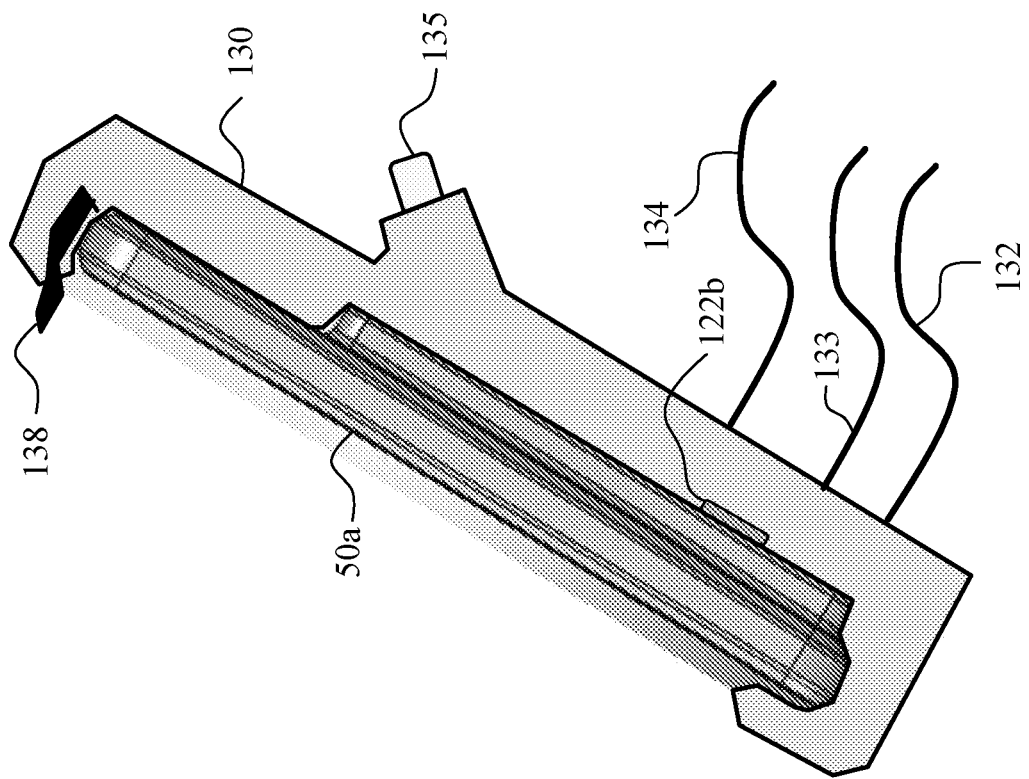
FIG. 9 is an illustration of docking station for connecting modified smartphone to vehicle or similar infrastructures.

In many cases it is desired to connect modified smartphone to docking station that is installed in a vehicle, truck, vessel, submarine, airplane or the like or to a stationary installation. Typically, such installation has continuous power supply services, better deployed antennas as well as some audio facilities. FIG. 9 illustrates docking station for such environments. Docking station 130 is configured to receive modified smartphone 50a. the docking station comprises locking mechanism 138 to ensure modified smartphone 50a is firmly attached do docking station 130. Through jacket docking connector 122b, modified smartphone 50a can get power supply connected to docking station 130 via cable 132. In addition, Audio in and audio out can be provided to modified smartphone via cable 133 and through jacket docking connector 122b. Secured data to be transmitted or received through modified smartphone 50a is provided to the docking station through cable 134. Security insert 70 may use the antennas that are connected to the docking station through RF connectors 135.

In a similar way jacket docking connector 122b may be connected via matching cable to equipment carried by a soldier. This equipment might be antenna or a terminal or the like.

It is expected that during the life of a patent maturing from this application many relevant wireless communication and wire connection standards will be developed and the scope of the invention is intended to include all such new technologies a priori.

The terms "comprises", "comprising", "includes", "including", "having" and their conjugates mean "including but not limited to".

As used herein, the singular form "a", "an" and "the" include plural references unless the context clearly dictates otherwise.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for securing an off-the-shelf smartphone comprising the steps of:
   removing the off-the-shelf smartphone's battery from a battery compartment of the off-the-shelf smartphone;
   inserting a security insert into the battery compartment, wherein the security insert comprises a cryptographic module and an enclosure, is configured to be deployed in the battery compartment and to occupy an entirety of the battery compartment, and lacks a batteryto deliver power to the off-the-shelf smartphone;
   modifying the off-the-shelf smartphone by adding a Smartphone-Insert-in-Battery- Compartment (SIBC) connector inside the battery compartment,
   wherein the SIBC connector enables powering of the security insert and data transfer between the off-the-shelf smartphone and the security insert, the off-the-shelf smartphone transmits and receives encrypted data, the cryptographic module encrypts the transmitted data and decrypts the received encrypted data respectively, and the SIBC connector comprises a smartphone-side SIBC connector and a matching security-insert-side SIBC connector on the enclosure of the security insert; and
   attaching an external power pack to deliver power to the off-the-shelf smartphone and to the security insert.

2. The method of claim 1, wherein the method further comprises at least one of (a) blocking, removing or disabling flash memory slots of the off-the-shelf smartphone, (b) loading alternative flash memory of the off-the-shelf smartphone with a modified software image, (c) blocking, removing or disabling of one or more cameras of the off-the-shelf smartphone.

3. The method of claim 1, wherein the method further comprises modifying or replacing power delivery circuitry of the off-the-shelf smartphone to provide at least one of (a) powering of the off-the-shelf smartphone and the security insert from a smartphone docking connector, (b) providing voltage-conversion-free powering to the off- the-shelf smartphone and the security insert from the smartphone docking connector, and (c) powering of the off-the-shelf smartphone from a security insert docking connector.

4. The method of claim 1, wherein the method further comprises at least one of (a) disconnecting data signals between the off-the-shelf smartphone and a smartphone docking connector, (b) connecting data signals between a red bus of the security insert and the off-the-shelf smartphone docking connector, (c) connecting data signals from a black bus of the security insert and the smartphone docking connector, and (d) dynamically switching, connecting or disconnecting, between data signals from the security insert red bus or black bus and the smartphone docking connector.

5. The method of claim 1, wherein the method further comprises adding a security insert docking connector on a back case of the off-the-shelf smartphone, wherein the security insert docking connector provides at least one of (a) power delivery, (b) data transfer, and (c) RF signals transfer.

6. The method of claim 1, wherein the method further comprises coupling additional power sources to the off-the-shelf smartphone from at least one of (a) a power pack connected to a smartphone docking connector, (b) a power-back jacket connected to a security insert docking connector located on a back case of the off-the-shelf smartphone, and (c) an external power source connected to a jacket docking connector.

7. The method of claim 1, wherein the method further comprises installing modified high-security operating system software image onto the off-the-shelf smartphone, wherein the high-security operating system software image is configured to route all cellular outgoing data and all cellular incoming data via the cryptographic module such that cellular data exchange between the off-the-shelf smartphone and a cellular network is encrypted or decrypted by the cryptographic module.

8. The method of claim 1, wherein the external power pack is attached to at least one of the smartphone docking connector and a security insert docking connector.

9. The method of claim 1, wherein the method further comprises disabling a cellular modulator-demodulator (MODEM) of the off-the-shelf smartphone.

10. The method of claim 9, wherein the method further comprises at least one of (a) disconnecting the cellular MODEM of the off-the-shelf smartphone from one or more built-in antennas of the off-the-shelf smartphone, (b) connecting the security insert to the one or more of the built-in antennas using miniature coaxial cables, and (c) creating a hole in the battery compartment or in a body of the off-the-shelf smartphone and passing through the hole the miniature coaxial cables.

11. The method of claim 1, wherein the method further comprises removing or disabling an original carrier Subscriber Identity Module (SIM) of the off-the-shelf smartphone.

12. The method of claim 1, wherein the method further comprises removing or disabling wireless functions of the off-the-shelf smartphone.

13. The method of claim 12, wherein the method further comprises at least one (a) disconnecting wireless functions of the off-the- shelf smartphone from one or more built-in antennas of the off-the-shelf smartphone, (b) connecting the security insert to the one or more of the built-in antennas using miniature coaxial cables, and (c) creating a hole in the battery compartment or in a body of the smartphone and passing through the hole the miniature coaxial cables.

14. The method of claim 1, wherein the method further comprises integrating a battery into the security insert for powering critical functions of the security insert.

15. The method of claim 1, wherein the method further comprises providing user interface operations to erase secret keys of the cryptographic module.

16. A secure communication system comprising:
   a modified off-the-shelf smartphone comprising a security insert in a battery compartment of the off-the-shelf smartphone, wherein the security insert comprises a cryptographic module;
   a Smartphone-Insert-in-Battery-Compartment (SIBC) connector that is added and located inside the battery compartment and is configured to power the security insert; and
   a power source that delivers the power to the security insert from any one of or the combination of (a) a smartphone docking connector through the SIBC connector, and (b) a security insert docking connector, wherein the security insert is configured to occupy the entire battery compartment of the and lacks a battery to deliver power to the modified off-the-shelf smartphone, wherein the secure communication system wirelessly transmits outgoing cellular encrypted black data, which is encrypted by the cryptographic module, from the modified off-the-shelf smartphone, prior to transmission wherein incoming cellular black data received from the cellular network by the modified off-the-shelf smartphone is decrypted by the cryptographic module, and wherein the SIBC connector comprises a smartphone-side SIBC connector and a matching security-insert-side SIBC connector on an enclosure of the security insert.

17. The secure communication system of claim 16 wherein
the power source that delivers power to the security insert through the security insert docking connector is one or both of
(a) a power-pack jacket, and
(b) a jacket docking connector located on a jacket.

18. The secure communication system of claim 16, wherein the encrypted black data is wirelessly transmitted or received through at least one of
(a) built-in antennas of the modified off-the-shelf smartphone,
(b) antennas the modified back case of the modified off-the-shelf smartphone,
(c) antennas in a power-pack jacket of the modified off-the-shelf smartphone, and
(d) external antennas of the modified off-the-shelf smartphone connected through a jacket docking connector.

19. The secure communication system of claim 16, wherein the modified off-the-shelf smartphone comprises one or more wireless functions that are removed or disabled in the modified off-the-shelf smartphone, wherein the security insert comprises alternative similar wireless functions, and wherein usage of the wireless function by the modified off-the-shelf smartphone is performed by the alternative similar wireless functions of the security insert using at least one of or any combination of
(a) built-in antennas of the modified off-the-shelf smartphone,
(b) antennas the modified back case of the modified off-the-shelf smartphone,
(c) antennas in a power-pack jacket of the modified off-the-shelf smartphone, and
(d) external antennas of the modified off-the-shelf smartphone connected through a jacket docking connector.

20. The secure communication system of claim 19, wherein the wireless function is a cellular MODEM.

21. The secure communication system of claim 19, wherein the wireless functions are at least one of (a) Wi-Fi, (b) Bluetooth, (c) GPS, and (d) Near-field communication (NFC).

22. The secure communication system of claim 16, wherein the secure communication system further comprises a public cellular infrastructure and a private cloud or network, the private cloud or network comprising matching cryptographic functions and having matching keys to encrypt data that is transmitted to the modified off-the-shelf smartphone through the public cellular infrastructure, or to decrypt data that is transmitted from the modified off-the-shelf smartphone through the public cellular infrastructure.

23. The secure communication system of claim 16, wherein the modified off-the-shelf smartphone comprises a back case including an inner side security insert docking connector and an outer side security insert docking connector to provide at least one of (a) power supply from external source, (b) data transfer with external source, (c) RF signals transfer with one or more external antennas.

24. The secure communication system of claim 16 wherein the security insert comprises a rechargeable battery that is configured to power critical functions of the security insert.

25. The secure communication system of claim 16, wherein the cryptographic module encrypts and decrypts using at least one of (a) Advanced Encryption Standard, (b) Elliptic curve cryptography, (c) Data Encryption Standard, (d) TripleDES, (e) Rivest-Shamir-Adleman, (f) Twofish, and (g) Blowfish encryption standards.

26. The secure communication system of claim 16, wherein the security insert comprises an anti-tampering switch or sensor.

27. The secure communication system of claim 16, wherein the system further comprises user interface elements to erase secret keys of the cryptographic module.

28. The secure communication system of claim 16, wherein the smartphone docking connector and the security insert docking connector comprise a USB interface.

29. A security insert for secure communication system comprising:
an enclosure configured to be deployed in a battery compartment of an off-the-shelf smartphone;
a cryptographic module; and
a Smartphone-Insert-in-Battery-Compartment (SIBC) connector configured to be coupled to a matching SIBC connector that resides in a battery compartment of a modified off-the-shelf smartphone, and configured to transfer data between the security insert and the off-the-shelf smartphone,
wherein the secure communication system transmits and receives encrypted data and the cryptographic module encrypts the transmitted data and decrypts the received encrypted data respectively, and wherein the security insert is configured to occupy an entirety of the battery compartment and lacks a battery to deliver power to the off-the-shelf smartphone.

30. The security insert of claim 29, wherein a power source to power the security insert is an external power pack attached to a smartphone docking connector of the off-the-shelf smartphone.

31. The security insert of claim 29, wherein the cryptographic module encrypts and decrypts using at least one of (a) Advanced Encryption Standard, (b) Elliptic curve cryptography, (c) Data Encryption Standard, (d) TripleDES, (e) Rivest-Shamir-Adleman, (f) Twofish, and (g) Blowfish encryption standards.

32. The security insert of claim 29, wherein the security insert is configured to wirelessly transmit and receive encrypted black data through at least one of
(a) built-in antennas of the modified off-the-shelf smartphone,
(b) antennas in a modified back case of the off-the-shelf smartphone,
(c) antennas in a power-pack jacket of the off-the-shelf smartphone, and
(d) external antennas connected through a jacket docking connector.

33. The security insert of claim 29, wherein the security insert comprises a security insert docking connector to provide at least one of
(a) power delivery from an external power source,
(b) data transfer with an external source, (c) RF signals transfer with one or more external antennas, and (d) loading software, data or cryptographic keys.

34. The security insert of claim 29, wherein the cryptographic module comprises:

a high-security side, connected to a high-security red bus, for exchanging sensitive data only; and a low-security side, connected to a low-security black bus, for exchanging only encrypted data, wherein the encrypted data is at least one of (a) data to be decrypted by the cryptographic module, and (b) data encrypted by the cryptographic module.

35. The security insert of claim 34, wherein the security insert comprises wireless functions, wherein the wireless functions are coupled to the low-security black bus, and wherein the off-the-shelf smartphone is coupled to the high-security red bus.

36. The security insert of claim 29, wherein the security insert is configured to receive user interface operations to erase secret keys of the cryptographic module.

37. The security insert of claim 29, wherein the security insert further comprises a cellular MODEM.

38. The security insert of claim 29, wherein the security insert further comprises a SIM card socket.

39. The security insert of claim 29, wherein the security insert further comprises at least one of the following wireless functions: (a) Wi-Fi, (b) Bluetooth, (c) GPS, and (d) NFC.

* * * * *